United States Patent
Jones et al.

[11] Patent Number: 5,814,119
[45] Date of Patent: Sep. 29, 1998

[54] TRANSFER MECHANISM

[75] Inventors: Stanley Peter Jones, Tickhill, United Kingdom; Zdenko Kuz, Cham, Switzerland

[73] Assignee: Emhart Glass Machinery Investments Inc., Wilmington, Del.

[21] Appl. No.: 795,173

[22] Filed: Feb. 4, 1997

[30] Foreign Application Priority Data

Feb. 15, 1996 [GB] United Kingdom ............... 9603183

[51] Int. Cl.⁶ ........................................... C03B 9/44
[52] U.S. Cl. ............................ 65/235; 65/241; 65/260
[58] Field of Search ............................. 65/235, 241, 260

[56] References Cited

U.S. PATENT DOCUMENTS

| | | |
|---|---|---|
| 2,151,876 | 3/1939 | Wadman . |
| 3,434,820 | 3/1969 | Zappia et al. . |
| 3,573,027 | 3/1971 | Nuzum, Sr. . |
| 4,058,388 | 11/1977 | Zappia . |
| 4,162,911 | 7/1979 | Mallory . |
| 4,461,637 | 7/1984 | Jones et al. . |
| 4,986,844 | 1/1991 | Fenton . |
| 5,547,485 | 8/1996 | Jones . |
| 5,649,989 | 7/1997 | Jones . |
| 5,649,991 | 7/1997 | Jones . |

*Primary Examiner*—Steven P. Griffin
*Attorney, Agent, or Firm*—Spencer T. Smith

[57] ABSTRACT

A transfer mechanism for transferring glass parisons in an I.S machine from a blank station to a second station comprises two neck-ring mechanisms which operate alternately. While one neck-ring mechanism carries parisons from the blank station in a vertical plane to the second station, the other neck-ring mechanism rotates about a vertical axis to move out of the way of the first while moving from the second station back to the blank station.

4 Claims, 12 Drawing Sheets

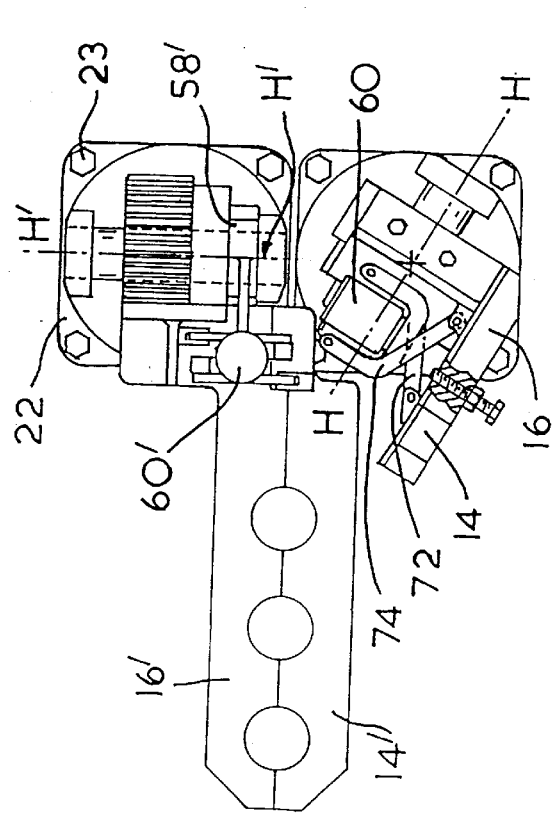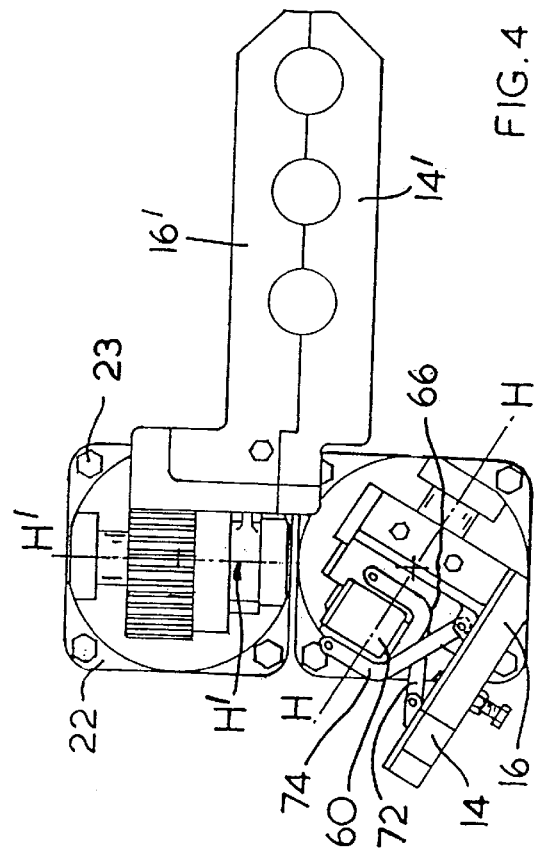

TRANSFER MECHANISM

This invention is concerned with a transfer mechanism for transferring and inverting parisons in a section of a glassware forming machine from a blank station where the parisons are formed to a second station.

BACKGROUND TO THE INVENTION

A conventional I.S. glass container forming machine comprises a series of sections arranged along side each other and operating out of phase with each other. Each section is equipped with a single parison transfer or invert mechanism carrying one or more neck-rings. Taking single gob operation as an example, the machine cycle commences with the neck-ring in a reverted position adjacent the blank station, with a parison mould closed around it. A charge of glass enters the upper end of the parison mould and is blown or pressed into a parison shape with some glass being forced into the space between the neck-ring and a plunger to form a finish end of the final container. The parison mould then opens leaving the parison held by its finish end in the neck-ring. The invert mechanism then operates to carry the parison from the parison forming stage at the blank station and to invert it into a second forming station, e.g. a blow mould station where the blow mould closes around it. The neck-ring is then opened, dropping the parison into the blow mould where it is supported by a bead formed on the finish. The invert mechanism returns the neck-ring to the blank station and the parison forming station and the parison mould closes around it ready for the next charge of glass. Meanwhile the parison hanging in the blow mould is blown into the final container.

Various steps have been taken in recent years to increase the speed of the container forming process e.g. by the introduction of axial mould cooling methods and the reduction in the wall thickness of the finished container. However, the thickness of the glass in the finish has not been reduced to the same extent and in lightweight containers today the thickest glass is often to be found here. As machine speeds have increased, the time available for the forming and cooling of the glass in the finish has become disproportionately reduced. This is a particular problem when the parison is formed by a plunger in a press process for the neck-ring is the last part of the parison mould equipment to be filled with glass. The result is that the glass in the finish is not cool enough and thus not hard enough to maintain its shape accurately, leading to subsequent distortion and loss of ware. Further reduction in the weight of the finish is limited because, should the distance between the neck-ring and the plunger inside it become to small, it is not possible to force glass into the neck-ring and containers are formed with incomplete finishes.

One method available to reduce this problem is to apply more cooling to the neck-ring. This is only partially effective because, if the neck-ring becomes too cold, defects are formed in the container finishes. Also because of the very low thermal conductivity of the glass a cooler neck-ring does not take out appreciably more heat from the glass. A more effective solution to the problem would be to increase the time of contact between the finish of the container and the neck-ring but this is not possible with a single neck-ring per blank mould without slowing down the machine cycle which is commercially unacceptable.

The provision of two sets of neck-rings will overcome the problem described above, and has other benefits. The parison is made and inverted in the normal way but instead of being dropped into the blow mould when the neck-rings open, the neck rings may remain closed during at least part of the blowing operation. The extra time available for contact between the glass finish and the neck-rings can extend to almost a complete machine cycle if required. More time is also be available for forming the parison, for the next cycle does not have to wait for the neck-rings to invert, open and return. Instead, an empty set of neck-rings can be available to move into position as soon as the filled neck-rings have left. Additionally, the speed of invert can be beneficially reduced for the inverting set of neck-rings is not required to be back in the reverted position as quickly as possible ready for the next cycle.

Several attempts have been made to devise ways of providing two sets of neck-rings on an individual section glass container forming machine. The main difficulty is interference between the set of neck-rings carrying the parison to the blow mould and the other, empty set of neck-rings returning to the parison forming position, particularly if the existing conventional width of the section is maintained, as is desirable.

One suggestion is made in U.S. Pat. No. 4,162,911, in which two sets of neck ring mechanisms are provided one on either side of a parison mould assembly, and operate alternately to transfer parisons outwards to two blow mould assemblies also on opposite sides of the parison mould assembly. Such an arrangement leads to a machine wherein the sections have to be arranged transversely next to each other rather than parallel to each other, with consequent problems of space and glass supply.

U.S. Pat. No. 3,434,820 describes a machine in which a chain carrying a series of neck-rings travels in a vertical loop thus holding returning neck-rings clear of ones carrying glass. Such an arrangement is only usable in a machine in which the parison is formed in an upright rather than an inverted position.

U.S. Pat. No. 4,058,388 describes a machine with two neck-ring mechanisms spaced apart transversely. The neck-rings are mounted on racks and interference is avoided by sliding the two mechanisms horizontally parallel to the centre line of the section while invert and revert movement takes place. Such an arrangement is mechanically complex and essentially requires a considerable width of the section.

U.S. Pat. No. 2,151,876 describes a machine having two neck-ring mechanisms mounted in a frame for rotation about a vertical axis. Each neck-ring mechanism is rotatable about a horizontal axis in the frame, and in each cycle rotation of the frame about its vertical axis and of the neck-ring mechanisms about their horizontal axes causes one neck-ring mechanism to carry formed parisons from a blank station to a blow station while the other neck-ring mechanism is caused to move from the blow station to the blank station. However not only is the mechanism somewhat cumbersome, and likely to be slow in operation, but it cannot be accommodated in the width of a section of conventional construction, and is thus not commercially acceptable.

In our EP application No 0620193 there is disclosed a section of an individual section glassware forming machine comprising a parison mould assembly comprising a parison mould, a blow mould assembly comprising a blow mould, the blow mould and the parison moulds being aligned along a centre axis of the section and a transfer mechanism for transferring parisons from the parison mould to the blow mould which comprises two neck-ring mechanisms each comprising a supporting member, two neck-ring arms mounted for rotation in the supporting member about a horizontal axis and means for moving the neck-ring arms towards and away from each other between open and closed positions, in which each arm comprises a neck-ring support such that when the neck-ring arms are in their closed position a neck-ring supporting aperture is provided, the two neck-ring mechanisms being arranged on opposite sides of the centre axis of the section, each mechanism being mounted for rotation about a vertical axis, each neck-ring mechanism operating in turn to move its neck-ring arms from a first position in which the neck supporting aperture is aligned with the parison mould and the horizontal axis is inclined to the centre axis to a second position in which the neck supporting aperture is aligned with the blow mould by movement of the neck ring arms through approximately 180° about the horizontal axis while the neck-ring mechanism rotates about its vertical axis, the neck-ring supporting apertures thus moving back and forth in planes which are inclined to be vertical.

The mechanism described in EP application No 0620193 has one or two shortcomings. One of these is that movement of the parisons from the blank station to the blow mould in a plane which is inclined to the vertical imposes additional centrifugal forces on the parison which may therefore become distorted. Another is that the neck-ring arms are mounted for arcuate movement between their open and closed positions, and it is often desirable, particularly in multi-gob constructions, to provide linear movement of the neck-ring arms between such open and closed positions.

BRIEF STATEMENT OF THE INVENTION

The present invention provides, as one of its features, a section of an individual section glass forming machine which section comprises a frame defining a blank station at which a gob of glass may be formed into a parison a second station at which further operations are performed on the parison, a transfer mechanism for transferring a formed parison from the blank station to the second station, the transfer mechanism comprising two neck-ring mechanisms, each neck-ring mechanism comprising two neck-ring arms supporting neck-rings, means for moving said arms towards and away from each other between closed and open positions, means for rotating said neck-ring arms about a horizontal axis, and and means for rotating said neck-ring arms about an axis perpendicular to the horizontal axis wherein the two neck-ring mechanisms operate alternately to carry parisons from the blank station to the second station, the neck-ring arms of one mechanism being rotated about its horizontal axis to carry its neck-rings in a vertical plane from a position adjacent the blank station to a position adjacent the second station while the neck-ring arms of the second mechanism are rotated about its horizontal axis to carry said neck-rings from a position adjacent the second station to a position adjacent the blank station and during such movement said neck-ring arms are rotated back and forth about the axis perpendicular to the horizontal axis to move said neck-ring arms of the second neck-ring mechanism out of the path of the neck-ring arms of the first neck-ring mechanism.

DESCRIPTION OF EMBODIMENTS OF THE INVENTION

There now follows a description, to be read with reference to the accompanying drawings, of two I.S. machine sections embodying the invention.

In the accompanying drawings:

FIG. 3 shows a plan view corresponding to FIG. 2 with the second neck-ring mechanism in its revert position and the first in an inclined, intermediate position;

FIG. 4 shows a view corresponding to FIG. 3 with the second mechanism in its invert position and the first in its inclined, intermediate position;

Figure 1:
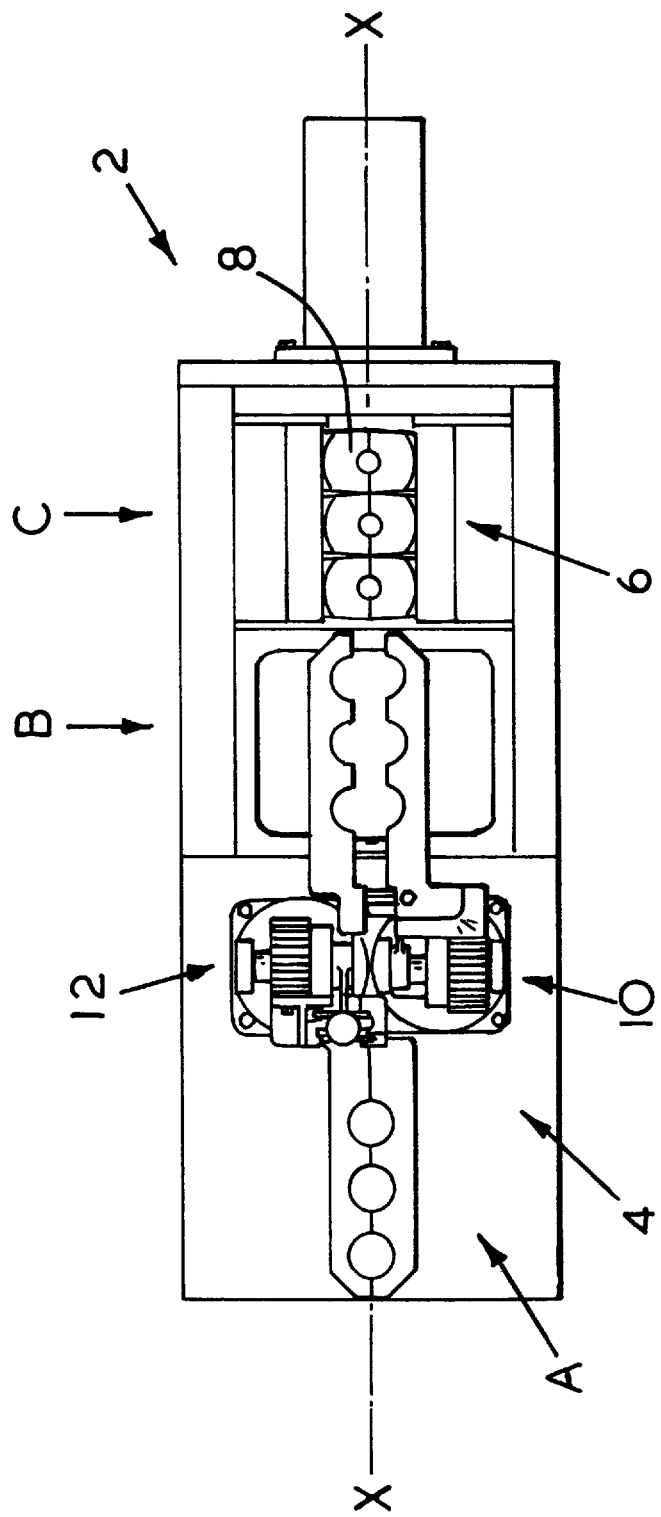
FIG. 1 shows a diagrammatic plan view of a section of an I.S machine with certain mechanisms omitted.

FIG. 1 shows a plan view of a section 2 of an I.S bottle forming machine which is generally similar to that described in our co-pending application EP 95306678.4. The section 2 which will in operation form one of a series of similar sections arranged alongside each other and operating out of phase with each other, comprises a frame defining a blank station A at which a gob of glass, supplied from conventional gob forming and distribution mechanism, may be formed into a parison, a second or intermediate station B, at which further operations are performed on the parisons, and a final forming station C. In the operation of the section 2 formed parisons are transferred from the blank station A to the second station B by a transfer mechanism 4, which transfers the parisons to blow moulds 8 of a blow mould assembly 6 of the section, which assembly then carries the parisons from the intermediate station B, at which a preliminary forming operation is performed on the parisons, to a final forming station C at which a final forming operation is performed on the parisons and from which the finally formed bottles are released from the section and transferred to a conveyor (not shown).

The transfer mechanism 4 comprises two neck-ring mechanisms 10,12 which are generally similar and almost mirror images of each other. The two mechanisms 10 and 12 are arranged symmetrically on opposite sides of a centre line X—X of the section 2.

The two neck-ring mechanisms are generally similar in construction and only the mechanism 10 will be described in detail. Corresponding parts of the mechanism 12 will be indicated where necessary by primed numerals.

Figure 2:
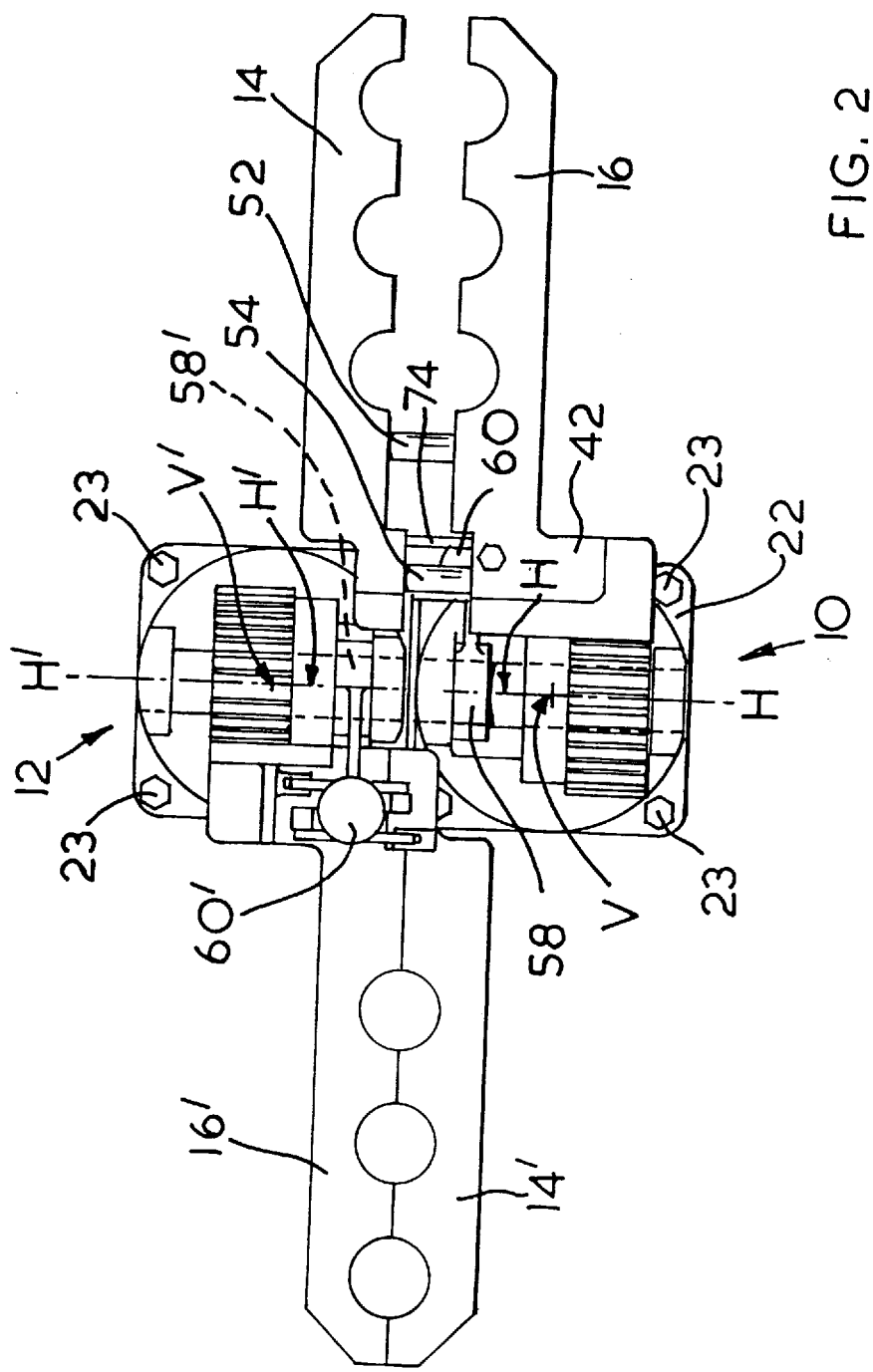
FIG. 2 shows a plan view of a transfer mechanism comprising two neck-ring mechanisms, a first neck-ring mechanism being in its invert position, and a second neck-ring mechanism in its revert position.
Figure 5:
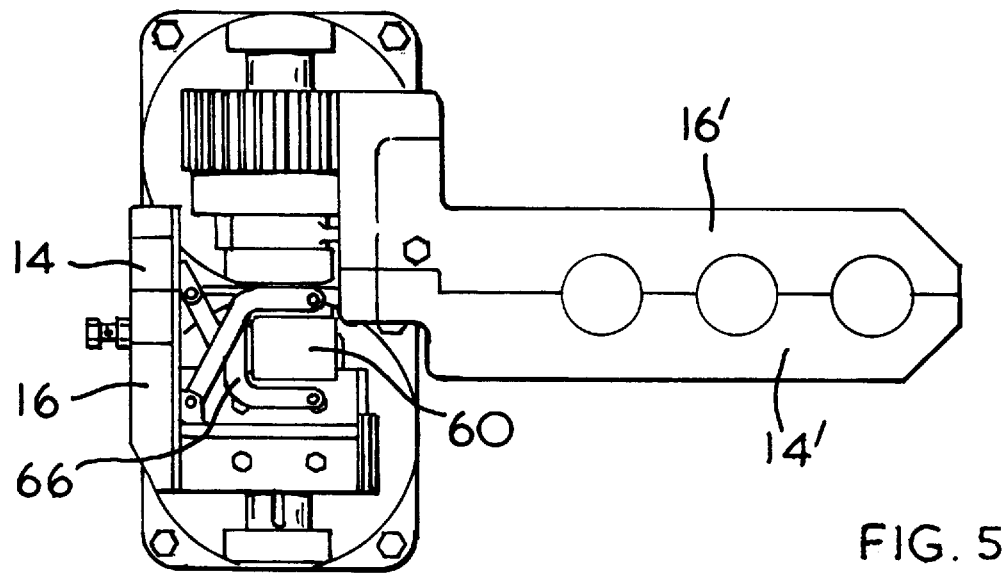
FIG. 5 shows a view corresponding to FIG. 3 with the second mechanism in its invert position and the first in an intermediate position just before movement into its revert position.
Figure 6:
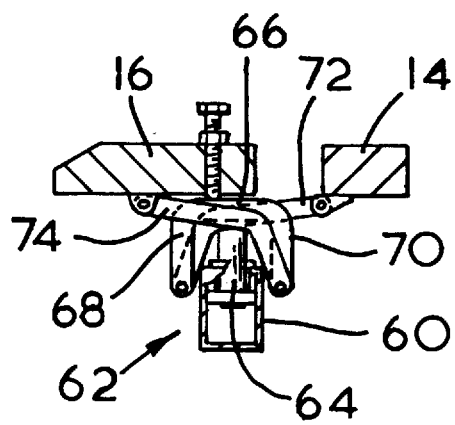
FIGS. 6 and 7 show an arm opening and closing mechanism.
Figure 7:
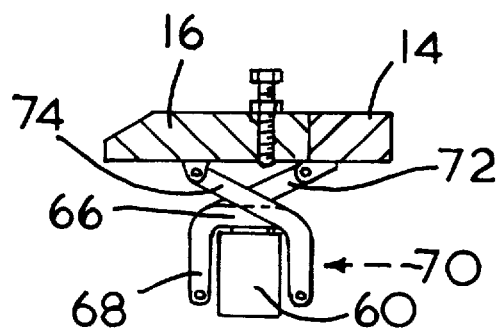

The neck-ring mechanism 10 comprises two neck-ring arms 14, 16. The illustrated section is a triple-gob section, and thus each of neck-ring arms 14, 16 supports three half neck-rings (not shown) adapted to support the neck or finish portion of a parison. The arms 14 and 16 are arranged to be moved towards and away from each other between a closed condition (in which the arms 14' and 16' are shown in FIG. 2) and an open condition (which the arms 14 and 16 are shown in FIG. 2), by an air operated mechanism (FIGS. 6 and 7). The mechanism 10 also, as will be described comprises means for rotating the arms 14, 16 about a horizontal axis H—H and means for rotating the arms 14, 16 about an axis perpendicular to the horizontal axis H—H, namely a vertical axis V—V. The arms 14' and 16' are rotated about a horizontal axis H'—H' and about a vertical axis V'.

The mechanism 10 (FIGS. 8, 9 & 10) comprises a main housing 18 which fits into an appropriate aperture of a top plate 20 of the frame of the section, the housing 18 comprising a circumferential flange 22 which lies on the plate 20 and is secured to it by bolts 23. Rotatably supported in the main housing 18 by roller bearings 24, 26 is a rotatable drive housing 28. Secured to drive housing 28 by bolts 30 is an upper housing 32. The upper housing 32 comprises two upwardly extending trunnions 34, 36 and a gear box 38 having a downwardly facing opening 40.

Rotatably mounted in the trunnions 34, 36 is a supporting shaft 41. The neck-ring arm 16 comprises a transverse bracket portion 42 towards one end which is secured by bolts 44 to a flat face 46 of a gear segment 48 which is mounted on the shaft 41 for limited axial sliding movement on the shaft. A key 50 ensures rotation of the arm 16 with the shaft 41. The arm 14 is provided with two guide rods 52, 54 extending horizontally from the arm 14 into bores in the arm 16 in which they are slidable, thus allowing for linear movement of the two arms 14, 16 towards and away from each other.

Supported on the shaft 41 between the trunnion 34 and the gear segment 48 is a collar 56 which supports a bracket 58 [FIG. 2]. Secured to the bracket 58 is a cylinder 60 [see FIGS. 2, 6 and 7] of a piston and cylinder device 62 having a piston rod 64 which supports a yoke 66 having downwardly extending arms 68, 70. The arm 68 pivotally supports a toggle lever 72 which is also pivoted to the neck-ring arm 14, while the arm 70 pivotally supports a toggle lever 74 which is also pivoted to the neck-ring arm 16. Pressurised air is supplied to move the piston and piston rod 64 in the cylinder 60. On movement of the piston rod 64 downwardly (viewing FIGS. 6 and 7) the toggle levers 72 and 74 act to draw the neck-ring arms 14 and 16 together into their closed condition: similarly upward movement of the piston rod 64 from its position shown in FIG. 7 serves to open the neck-ring arms 14 and 16.

Figure 9:
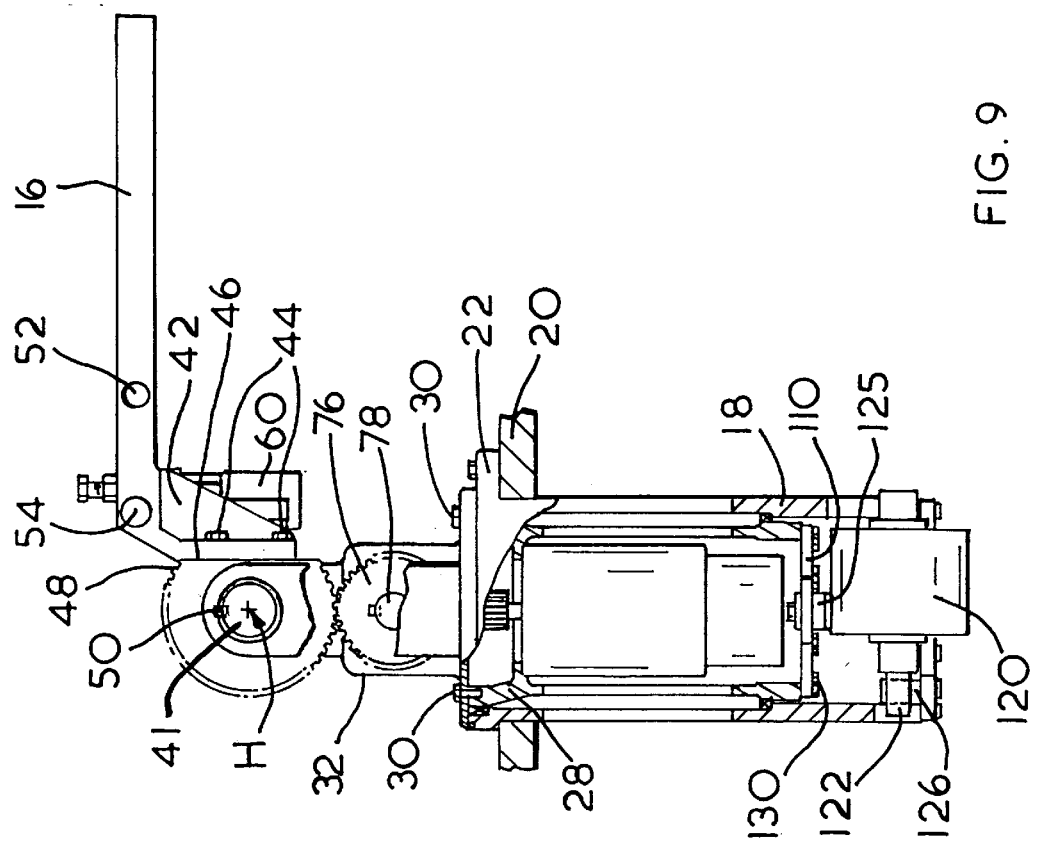
FIG. 9 shows a side view corresponding to FIG. 8, with some parts broken away and in section.
Figure 8:
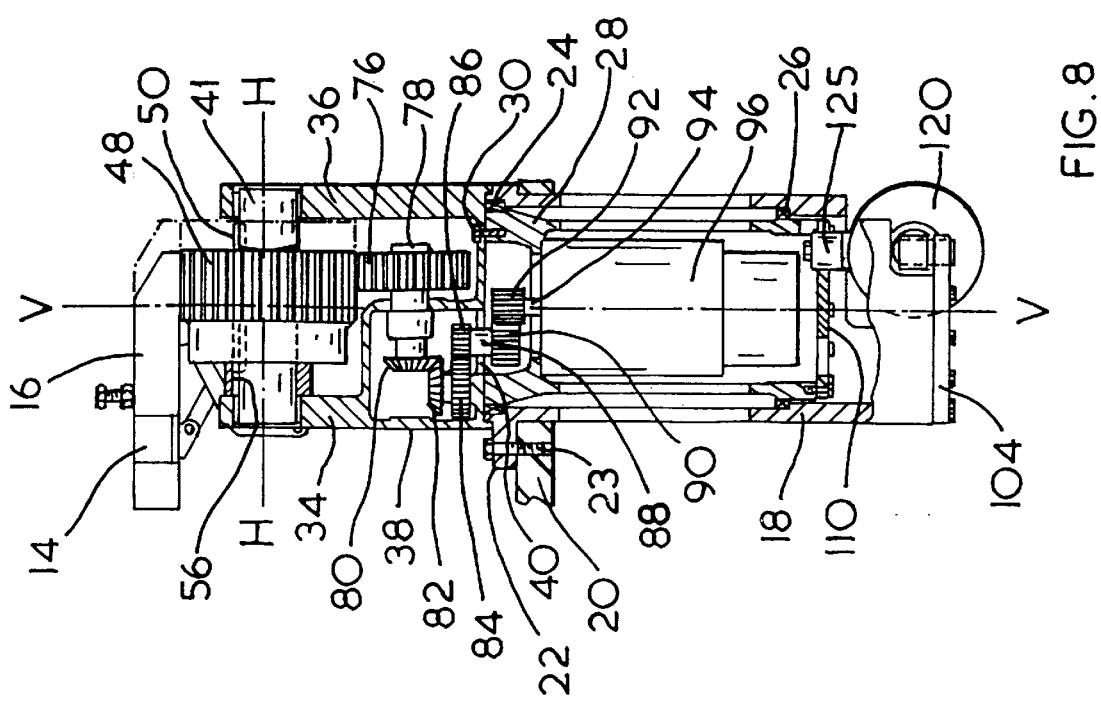
FIG. 8 shows a view in vertical section of a neck-ring mechanism.
Figure 10:
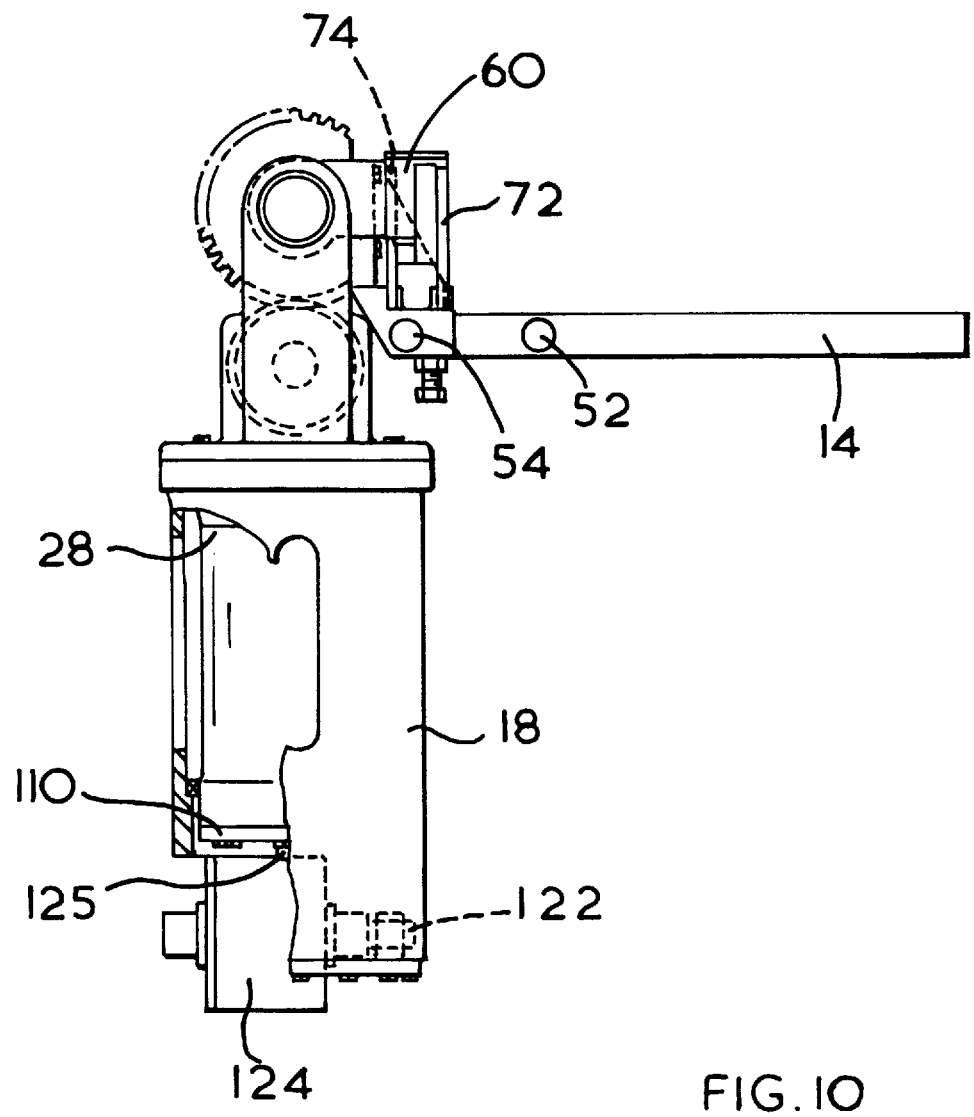
FIG. 10 shows a view, partly in section, of the opposite side of the mechanism of FIG. 9 in its revert position.

The gear segment 48 [FIGS. 8 and 9] has gear teeth part way round its circumference which engage with teeth of a gear 76 secured to a shaft 78 which is mounted in a wall of the gear box 38. The shaft 78 supports a bevel gear 80 which engages with another bevel gear 82 mounted on a vertical shaft which also supports a pinion 84. The pinion 84 engages another pinion 86 mounted on a vertical shaft 88 which supports another pinion 90 engaging a pinion 92 mounted on a drive shaft 94 of an electric servo motor 96 which is fixed in the drive housing 28. It will thus be seen that rotation of the shaft 94 of the servo motor 96 will, through the various gears and pinions, cause rotation of the gear segment 48 and thus of the neck-ring arms 14 and 16 about the horizontal axis H.

Figure 11:
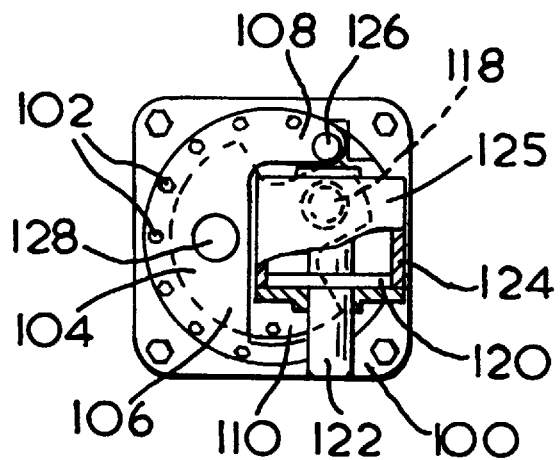
FIG. 11 shows a view from below of means for rotating a neck-ring mechanism.
Figure 12:
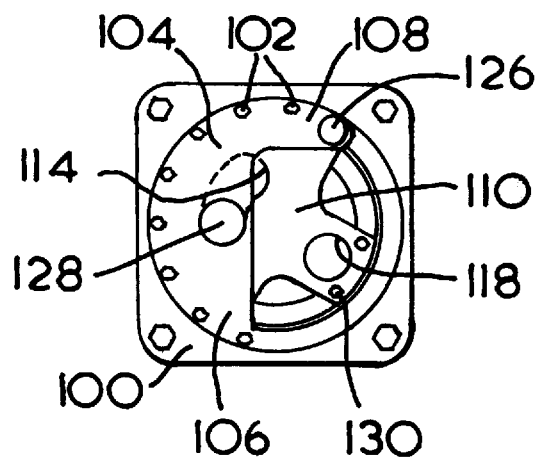
FIG. 12 shows a view corresponding to FIG. 11 with some parts removed.
Figure 13:
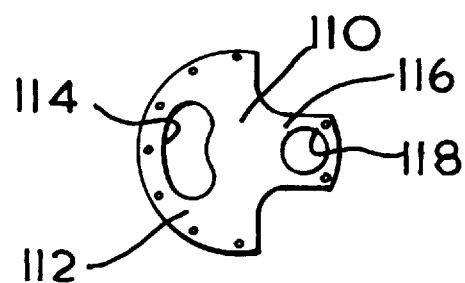
FIG. 13 shows a moving drive plate.

The means for causing rotation of the neck-ring arms 14, 16 about the vertical axis V—V will now be described with reference to FIGS. 11, 12 & 13.

A frame plate 100 having a circular central opening is secured to the bottom end face of the drive housing 18. Fixed in the opening of the frame plate 100 by bolts 102 is a fixed drive plate 104 comprising a sector portion 106 and an arm portion 108. Mounted above the drive plate 104 for limited rotary movement is a rotary drive plate 110 comprising a segment portion 112 provided with an arcuate slot 114 and a radial portion 116 having an aperture 118. A pneumatic piston and cylinder device 120 comprises a piston rod 122 and a cylinder 124: one end of the rod 122 is joined at 126 to the arm portion 108 of the fixed drive plate 104, while the cylinder 124 is pivoted by a boss 125 in the aperture 118 of the rotary drive plate. A pin 128 fixed in the fixed drive plate 104 extends into the slot 114 and thus determines the limit of arcuate movement of the rotating drive plate 110. The rotating drive plate 110 is fixed by bolts 130 to a bottom end face of the drive housing 28. Thus, viewing FIG. 11, air under pressure is supplied to the upper portion of the cylinder 124 of the piston and cylinder device 122. When this air is exhausted and air under pressure is supplied to the lower portion of the cylinder 124, the cylinder is forced downwards (viewing FIG. 11) thus causing the drive plate 110 to rotate clockwise to an extent limited by the pin 128 in the slot 114, and consequently rotating the housing 28 in the main housing 18, and consequently rotating the neck-ring arms 14, 16 about the vertical axis V—V.

It will be understood that the section 2 will comprise a control circuit to effect the timed operation of the piston and cylinder device 122, the servo motor 96 and the piston and cylinder device 62.

Operation of the invert mechanism of the section will now be described with reference to FIGS. 2, 3, 4 and 5. In FIG. 2, the neck-ring arms 14 and 16 are in their open conditions at the second station, having just released parisons at that station, while the arms 14' and 16' are in their closed conditions at the first, blank, station under blank moulds at that station ready for parisons to be formed in the blank moulds.

The arms 14, 16 are then closed by operation of the piston and cylinder device 62. The arms 14, 16 are then caused to rotate about the horizontal axis H by operation of the servo motor 96 until the arms 14, 16 are extending vertically upwards. At the same time the piston and cylinder device 120 causes anticlockwise rotation of the arms 14, 16, about the vertical axis V viewing FIG. 3, about 60° to bring the arms 14, 16 into an inclined vertical position as shown in FIG. 3. The blank moulds having been moved out of the way, the arms 14', 16' are then caused, by the associated servo motor 96', to rotate about the horizontal axis H'—H' to carry formed parisons in an arcuate path in a vertical plane from the blank station to the second station (FIG. 4). It can be seen that the arms 14, 16 are spaced from the path of the arms 14', 16' in this movement. The piston and cylinder device 120 then causes clockwise rotation of the neck-ring arms 14, 16 about the vertical axis V to bring them into the position shown in FIG. 5, from which they are rotated about the horizontal axis H to bring them down into position at the blank station, to bring the neck-ring arms into positions corresponding to FIG. 2 with the positions of the arms 14, 16 exchanged with those of the arms 14', 16'. It will be understood that the precise timing of movement of the neck-ring arms can be adjusted within limits as desired.

Figure 14:
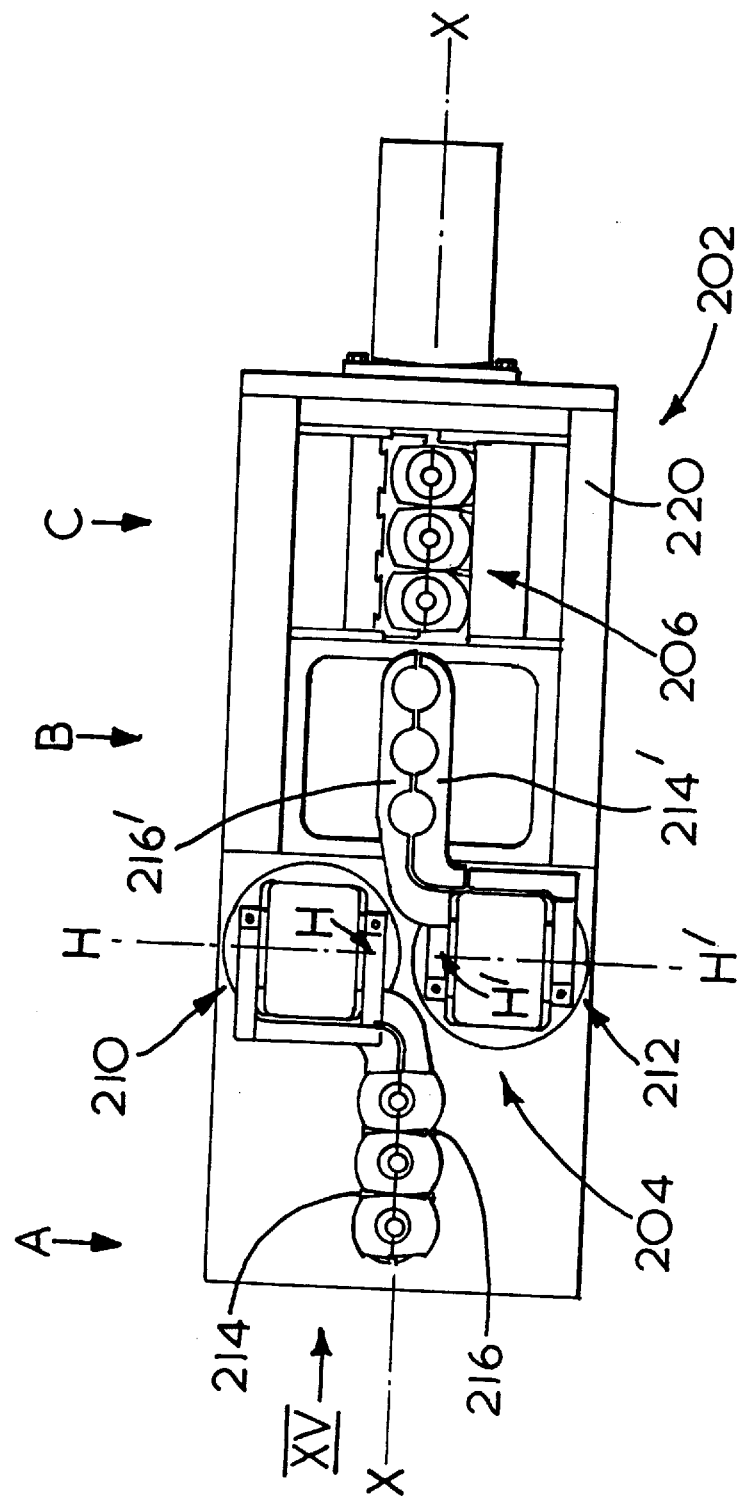
FIG. 14 shows a diagrammatic plan view of a section including an alternative transfer mechanism.
Figure 15:
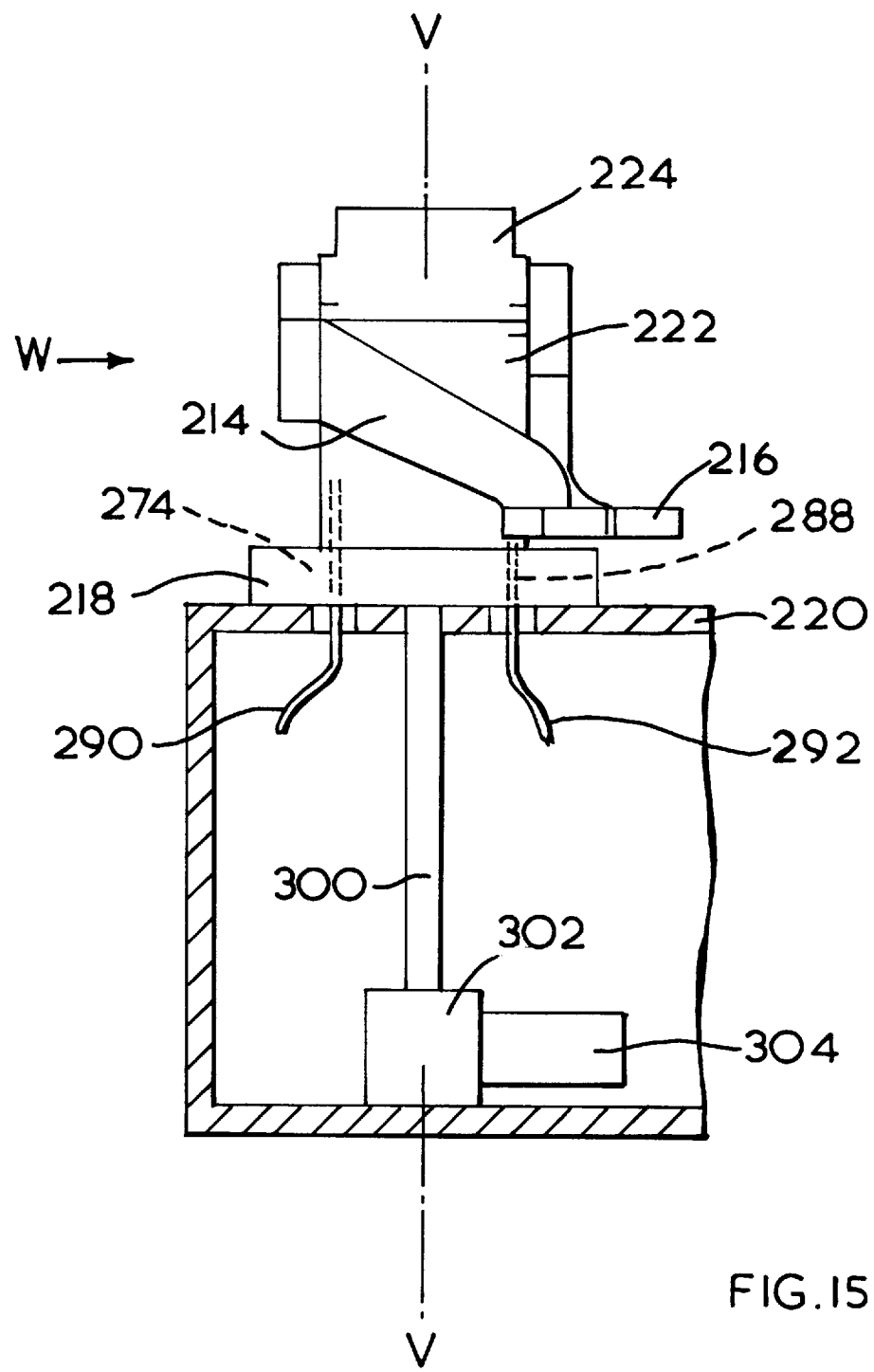
FIG. 15 shows a view of a neck ring mechanism of the alternative transfer mechanism taken in the direction XV in FIG. 14.
Figure 16:
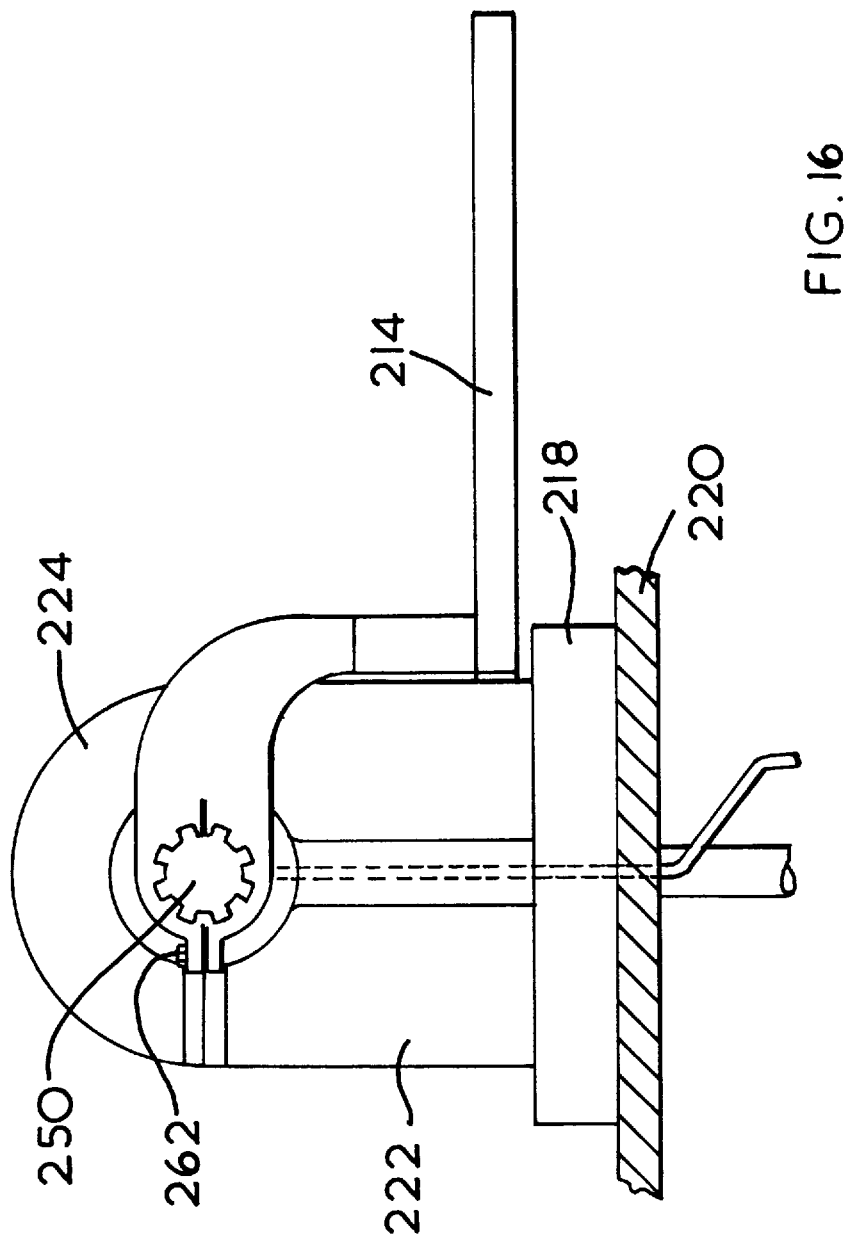
FIG. 16 shows a side view of the neck ring mechanism of FIG. 15.
Figure 17:
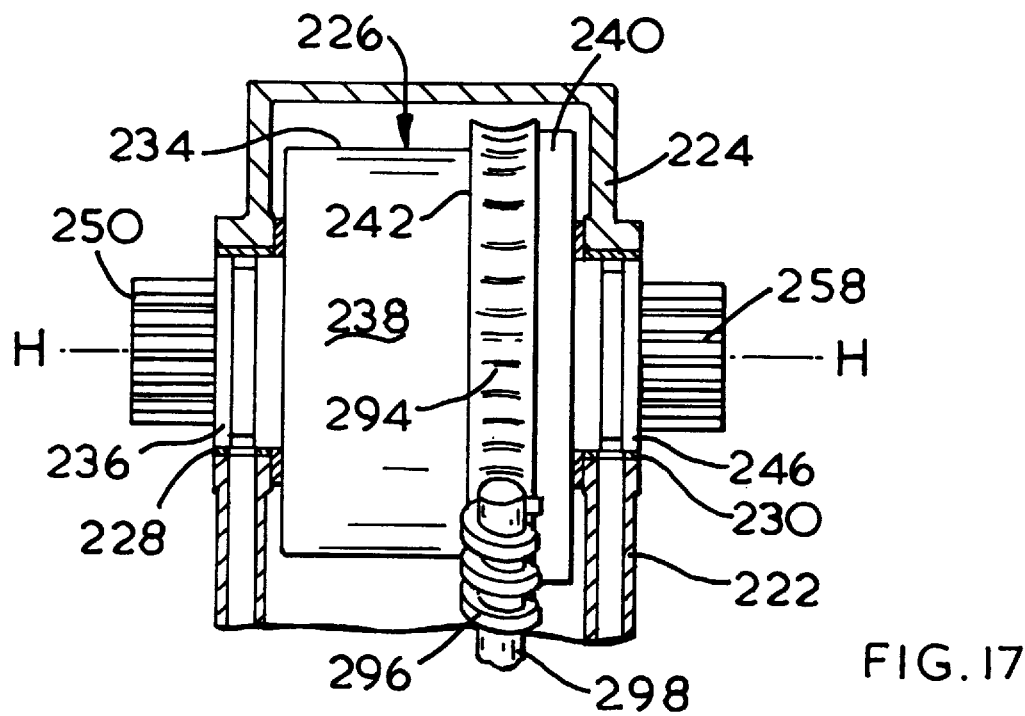
FIG. 17 shows a view in vertical section of part of the neck ring mechanism of FIG. 15.
Figure 18:
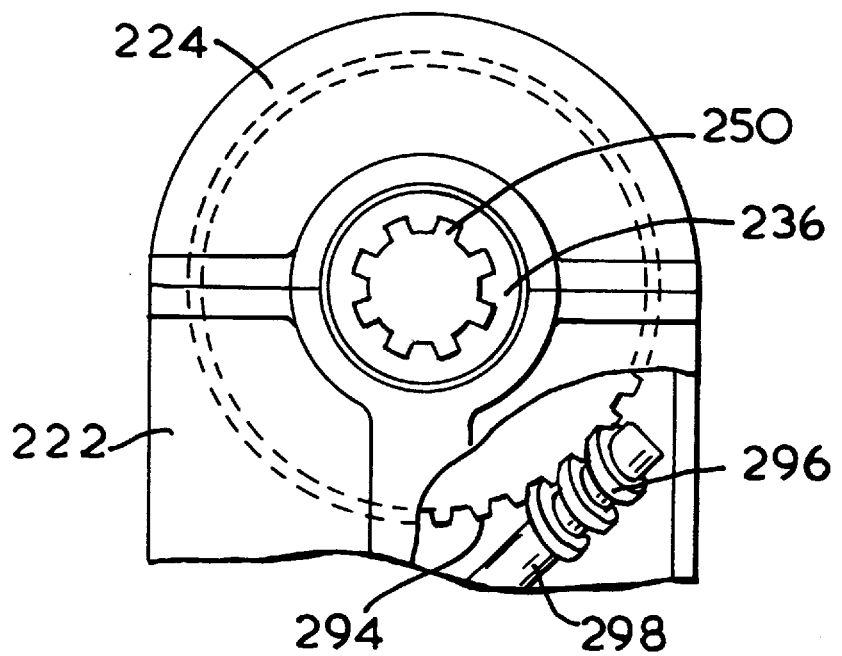
FIG. 18 shows a view, with some parts broken away, of the mechanism of FIG. 15.

FIG. 14 shows a plan view of a section 202 of an I.S machine bottle forming machine generally similar to the section 2 of FIG. 1. The section 202 comprises a blank station A, a second or intermediate station B and a final forming station C corresponding to the stations of the section 2.

The section 202 comprises a frame in which is mounted a transfer mechanism 204 which transfers parisons from the blank station A, at which they are formed, to blow moulds of a blow mould assembly 206.

The transfer mechanism 204 comprises two neck ring mechanisms 210, 212 which are generally similar and almost mirror images of each other. The two mechanisms 210, 212 are arranged symmetrically on opposite sides of a centre line X—X of the section 202. The two neck ring mechanisms 210, 212 are generally similar in construction, and only the mechanism 210 will be described in detail. Corresponding parts of the mechanism 212 will be indicated where necessary by primed numerals.

The neck ring mechanism 210 comprises two neck ring arms 214, 216. The illustrated section is a triple gob section and thus each of the neck ring arms supports three half neck rings (not shown) adapted to support the neck or finish portion of a parison. The arms 214, 216 are arranged to be moved towards and away from each other between a closed condition (as shown in FIG. 14) and an open condition (not shown) by an air operated mechanism, shown in detail in FIGS. 19 and 20. The mechanism 210 also, as will be described, comprises means for rotating the arms 214, 216 about a horizontal axis H—H and means for rotating the arms 214, 216 about an axis perpendicular to the horizontal axis, namely a vertical axis V—V.

The mechanism 210 comprises a base 218 which is secured to a top plate 220 of the frame of the section. Rotatably mounted on the base 218 is a housing 222 which has a cover 224 fixed to it. A cylindrical assembly 226 is mounted for rotation about the horizontal axis H—H in bearings 228, 230 secured between the housing 222 and the cover 224. The cylindrical assembly 226 is formed from a first cylinder member 234 having a sleeve portion 236, a circular portion 237 and a coaxial cylindrical portion 238, and a second cylinder member 240 having a cylindrical portion 242 which fits closely around the cylindrical portion 238 to provide a chamber 244, and a sleeve portion 246. The sleeve portion 236 is supported in the bearing 228, the sleeve portion 246 in the bearing 230.

A shaft 248 comprises a larger, splined portion 250 and a smaller coaxial portion 252. The splined portion 250 passes through a corresponding splined opening in the sleeve portion 236 of the first cylinder member 234, and a piston head 254, which fits closely in the chamber 244, is fixed to the shaft 248 between the splined portion 250 and the coaxial portion 252. Slidably mounted on the coaxial portion 252 is a piston 256 which comprises a splined shaft portion 258 mounted for movement in a corresponding splined opening in the sleeve portion 246 of the second cylinder member 240, and a piston head 260.

The neck ring arm 214 is clamped to the splined portion 250 by a bolt 262: the neck ring arm 216 is similarly clamped to the splined portion 258. In the operation of the mechanism, as will be now described, air under pressure is admitted between the piston heads 254 and 260 to move the piston heads away from each other to move the neck ring arms 214, 216 into their open condition, and subsequently the air between the pistons is exhausted while air is admitted to the chamber 244 against the outside faces of the piston heads 254 and 260 to return them to the position shown in FIG. 19 and to carry the neck ring arms back into their closed condition.

Figure 20:
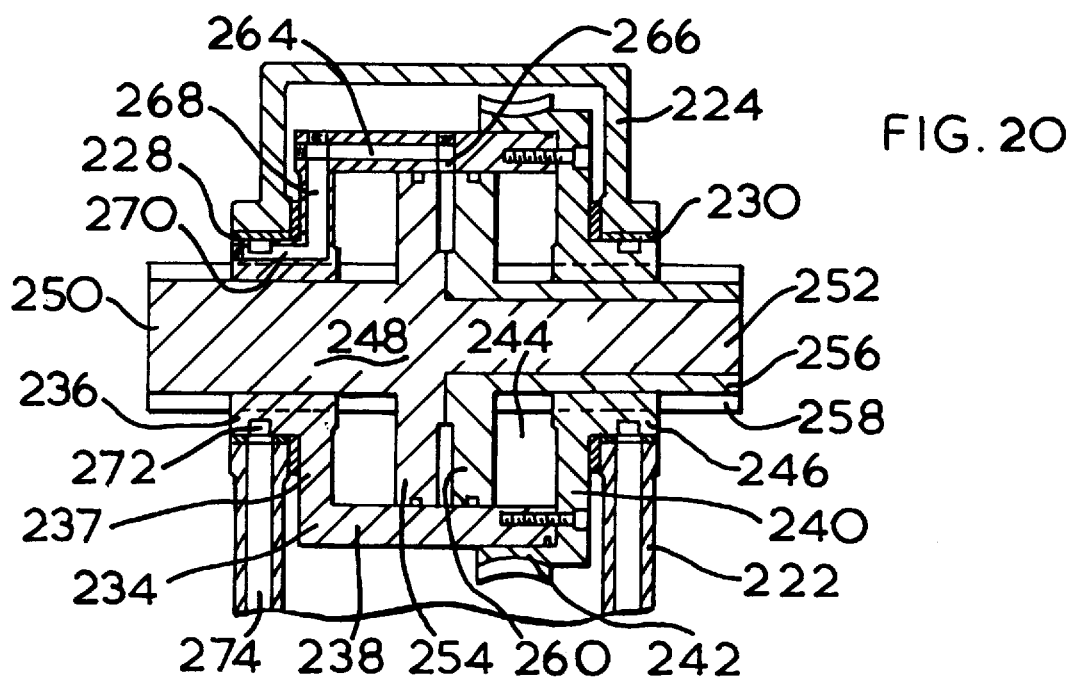

Viewing FIG. 20, an air passage 264 formed in the cylinder portion 238 extends from an opening 266 which opens into the space between the two piston heads 254, 260, to a further passage 268 formed radially in the circular portion 237. This leads to a transverse passage 270 formed in the sleeve portion 236. The passage 270 connects to an annular passage 272 formed circumferentially around the sleeve portion 236 which connects to a passage 274 which extends vertically through the housing 222. It can thus be seen that air under pressure supplied through the passage 274 will pass into the space between the pistons 254, 260.

Figure 19:
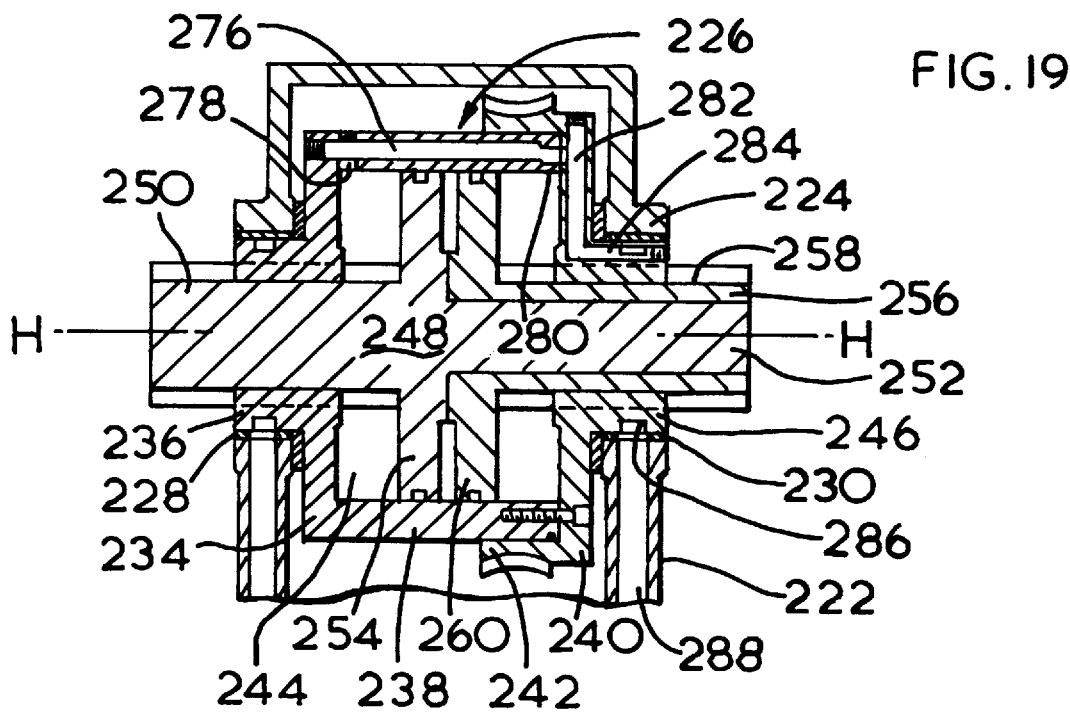
FIGS. 19 and 20 show views, in vertical section, corresponding to FIG. 17.

Viewing FIG. 19, which shows a different cross section of the cylindrical assembly 226, an air passage 276 is formed in the cylinder portion 238 and connects an opening 278 into the chamber 244 outside the piston head 254 and an opening 280 in to the chamber 244 outside the piston head 260. The passage 276 connects to a radial passage 282 in the second cylinder member 240, which in turn leads to a transverse passage 284 formed in the sleeve portion 246. The passage 284 connects to an annular passage 286 formed circumferentially around the sleeve portion 246 which connects to a passage 288 which extends vertically through the housing 222. It can thus be seen that air under pressure supplied through the passage 288 will pass into the spaces outside the piston heads 254, 260, thus tending to bring the piston heads together. The passages 274, 288, are connected to flexible pipes 290, 292 which extend through the base 218 into the interior of the section and are connected, through appropriate valves, not shown, to supplies of compressed air.

The neck ring mechanism 210 also comprises means for rotating the neck ring arms 214, 216 about the horizontal axis H—H. Formed circumferentially about the sleeve portion 242 of the second cylinder portion member 240 are gear teeth 294 forming a worm gear with which a worm 296 mounted on a shaft 298 is engaged. The shaft 298 is driven by an electrical servo motor (not shown) mounted in the housing 222. It can be seen that rotation of the shaft 298 causes rotation of the cylindrical assembly 226 and hence of the neck ring arms 214, 216 about the horizontal axis H—H.

Means are also provided for rotating the neck ring arms 214, 216 about an axis perpendicular to the horizontal axis H—H namely the vertical axis V—V. As has already been described, the housing 222 is rotatably mounted on the base 218. A vertical shaft 300 fixed to the housing 222 extends through the base 218 to a gear box 302 and is drawn by a servo motor 304. Thus operation of the servo motor 304 causes rotation of the housing 222.

It will be understood that, in similar fashion to the section 2, the section 202 comprises a control circuit to effect the timed operation of the opening and closing of the neck ring arms 214, 216 and 214', 216', the rotation of the arms about their horizontal axis H—H and the rotation of the arms about the vertical axis V—V analogously to the operation of the section 2.

We claim:

1. An I.S. machine having at least one section having a blank station where gobs of molten glass are formed into parisons and a blow station where the parisons are formed into bottles, with the direction from the blank mold to the blow mold being the transfer direction, each comprising a section frame, a transfer mechanism for transferring parisons from the blank station to the blow station, said transfer mechanism including a first pair of opposed closed neck ring arms, a second pair of opposed closed neck ring arms, a first support for supporting said first pair of opposed closed neck ring arms for rotation 180° about a first horizontal axis extending perpendicularly to the transfer direction, from a start position at the blank station where said neck ring arms extend horizontally, through an intermediate position where said neck ring arms extend vertically upwardly, to an end position at the blow station where said arms extend horizontally, a second support for supporting said second pair of opposed closed neck ring arms for rotation 180° about a second horizontal axis extending perpendicularly to the transfer direction, from a start position at the blank station where said arms extend horizontally, through an intermediate position where said neck ring arms extend vertically upwardly, to an end position at the blow station where said arms extend horizontally, a third support for supporting said first support for rotation about a first vertical axis from a first orientation where said first horizontal axis extends perpendicularly to the transfer direction to a second orientation, and a fourth support for supporting said second support for rotation about a second vertical axis from a first orientation where said second horizontal axis extends perpendicularly to the transfer direction to a second orientation, said first support and said first pair of opposed closed neck ring arms being selectively configured so that when said first support is at said second orientation and said first pair of closed neck ring arms is at said intermediate position and said second support is at said first orientation, said second pair of neck ring arms can be rotated about said first horizontal axis from the blank station to said blow station, and said second support and said second pair of opposed closed neck ring arms being selectively configured so that when said second support is at said second orientation and said second pair of closed neck ring arms is at said intermediate position and said first support is at said first orientation, said first pair of neck ring arms can be rotated about said first horizontal axis from the blank station to said blow station.

2. An I.S. machine according to claim 1, wherein each of said first and second supports comprises a housing including a pair of upwardly extending trunnions and a shaft rotatably supported by said trunnions.

3. An I.S. machine according to claim 2, wherein one of said first pair of neck ring arms includes a gear segment concentrically positioned about said shaft of said first support and wherein one of said second pair of neck ring arms includes a gear segment concentrically positioned about said shaft of said second support.

4. An I.S. machine according to claim 3, wherein each one of said third and fourth supports comprises a drive housing mounted on said section frame for rotation about a corresponding one of said first or second vertical axes, and means for rotating said drive housing to rotate a corresponding one of said first or second supports from said first orientation to said second orientation.

* * * * *